US012181861B2

(12) United States Patent
Beckhoff et al.

(10) Patent No.: US 12,181,861 B2
(45) Date of Patent: Dec. 31, 2024

(54) METHOD FOR OPERATING AN AUTOMATION SYSTEM AND DATA INFRASTRUCTURE

(71) Applicant: Beckhoff Automation GmbH, Verl (DE)

(72) Inventors: Hans Beckhoff, Verl (DE); Leon Zink, Verl (DE); Sven Goldstein, Bünde (DE)

(73) Assignee: Beckhoff Automation GmbH, Verl (DE)

( * ) Notice: Subject to any disclaimer, the term of this patent is extended or adjusted under 35 U.S.C. 154(b) by 355 days.

(21) Appl. No.: 17/727,340

(22) Filed: Apr. 22, 2022

(65) Prior Publication Data

US 2022/0260975 A1 Aug. 18, 2022

Related U.S. Application Data

(63) Continuation of application No. PCT/EP2020/082543, filed on Nov. 18, 2020.

(30) Foreign Application Priority Data

Nov. 22, 2019 (DE) ...................... 10 2019 131 622.7

(51) Int. Cl.
*G05B 19/418* (2006.01)
(52) U.S. Cl.
CPC ..... *G05B 19/4185* (2013.01); *G05B 19/4183* (2013.01)
(58) Field of Classification Search
CPC ............ G05B 19/4185; G05B 19/4183; H04L 12/4625
See application file for complete search history.

(56) References Cited

U.S. PATENT DOCUMENTS 6,321,272 B1 11/2001 Swales
9,602,312 B2 * 3/2017 Koponen ................ H04L 45/04
(Continued)

FOREIGN PATENT DOCUMENTS

CN 105723658 A 6/2016
CN 107105002 A 8/2017
(Continued)

OTHER PUBLICATIONS

International Preliminary Report on Patentability dated Feb. 7, 2022 in connection with PCT/EP2020/082543, 40 pages including English translation.
(Continued)

*Primary Examiner* — Chad G Erdman
(74) *Attorney, Agent, or Firm* — Dorsey & Whitney LLP

(57) ABSTRACT

A method is provided for operating an automation system having a first controller and a second controller and an external data infrastructure with a message-distributing module. The method includes defining a first communication network and identifying the first controller and the second controller as first communication subscribers of the first communication network via the message-distributing module, sending out a first network message via the first controller to the message-distributing module of the external data infrastructure, identifying the second controller as the first communication subscriber of the first communication network addressed via the first controller using the message-distributing module, forwarding the first network message sent out by the first controller to the second controller via the message-distributing module, and receiving the forwarded first network message via the second controller. Further, a data infrastructure system for execution of the method for operating an automation system is provided.

15 Claims, 6 Drawing Sheets

(56) References Cited

U.S. PATENT DOCUMENTS

| | | | |
|---|---|---|---|
| 10,230,813 B2 | 3/2019 | Wesselmann et al. | |
| 11,012,256 B2 | 5/2021 | Dresselhaus et al. | |
| 2010/0205535 A1* | 8/2010 | Mitamura | H04L 41/12 |
| | | | 715/735 |
| 2014/0337500 A1 | 11/2014 | Lee | |
| 2015/0039752 A1 | 2/2015 | Hague | |
| 2016/0274552 A1 | 9/2016 | Strohmenger et al. | |
| 2017/0244791 A1 | 8/2017 | Ripplinger | |

FOREIGN PATENT DOCUMENTS

| | | |
|---|---|---|
| CN | 109074044 A | 12/2018 |
| DE | 102017213365 A1 | 2/2019 |
| EP | 2109259 A1 | 10/2009 |
| EP | 2506502 A1 | 10/2012 |
| EP | 3462673 A1 | 4/2019 |
| WO | 2017182671 A1 | 10/2017 |

OTHER PUBLICATIONS

International Search Report and Written Opinion dated Feb. 18, 2021 in connection with PCT/EP2020/082543, 18 pages including English translation.
Office Action dated Jan. 13, 2023 in connection with Chinese patent application No. 202080081021.4, 7 pages including English translation.

\* cited by examiner

METHOD FOR OPERATING AN AUTOMATION SYSTEM AND DATA INFRASTRUCTURE

CROSS-REFERENCE TO RELATED APPLICATIONS

This is a continuation of International Patent Application No. PCT/EP2020/082543, filed 18 Nov. 2020, entitled METHODS FOR OPERATING AN AUTOMATION SYSTEM AND DATA INFRASTRUCTURE, which claims priority to German patent application DE 10 2019 131 622.7, filed 22 Nov. 2019, entitled VERFAHREN ZUM BETREIBEN EINES AUTOMATISIERUNGSSYSTEMS UND DATENINFRASTRUKTUR, each of which is incorporated by reference herein, in the entirety and for all purposes.

FIELD

The present invention relates to a method for operating an automation system and to a data infrastructure, which is particularly embodied as an external data infrastructure.

BACKGROUND

In general, the present invention deals with integrating an external data infrastructure into an automation system and outsourcing processes of the automation system to the external data infrastructure. In particular, the invention may be used in automation systems for industrial automation, for building and air conditioning automation, for stage technology, for energy technology or for traffic control technology. Within the framework of industrial automation, the automation system may e.g. control presses, packaging machines or equipment for carrying out chemical processes; in the context of building automation, it may e.g. control heating and ventilation systems, sunshade systems or access systems of a building. In energy technology, automation systems may be used in wind turbines, photovoltaic systems, biomass power plants, or energy metering systems, among others. The examples mentioned herein are not to be considered as an exhaustive list and do not limit the scope of protection of the present invention.

Automation systems serve to control automation processes. An automation process usually involves reading in input data that characterize the state of the automation process. Input data may be on the basis of measurement data from sensors. On the basis of the input data, output data are created, usually by a controller of the automation system, which are used to control the automation process. The output data usually represent control values for actuators of the automation system. In the following, sensors and actuators are summarized in the term field devices. Field devices may also comprise further components and be embodied to participate in data communication with the controller by sending out input data to the controller or receiving output data sent by the controller. For this purpose, these are connected to the controller of the automation system via a data line, e.g. via a field bus. Via the data line, the read-in measured values are transmitted as input data from the field devices to the controller for further processing, and the control values provided by the controller are transmitted to the field devices as output data. In such a case, the field devices are embodied to perform a conversion between the input and output data circulating on the data line and the field signals.

Automation systems may be divided up into a field level and a control level. The field level comprises all field elements of the automation system, which are usually arranged close to the process, i.e. at or in the vicinity of a controlled system, machine or other technical device, and which serve to forward or convert the input and output data and the field signals. Among other things, the field level comprises the field devices and the sensors and actuators encompassed by them. The control level comprises the controller and all further control components that receive the control data detected in the field level and process them to result in output control data for output to the field level. The field level and the control level are usually connected by one or more data lines which may be wired or wireless data lines.

The controller of the automation system may process the input and output data not only for the purpose of controlling the automation process, but also forward it to other controllers of the automation system. Especially in complex automation systems comprising a plurality of controllers, each of which controlling partial aspects of an automation process, data communication and information exchange between different controllers may be necessary. For this purpose, processing of the recorded input data by one of the communicating controllers may be necessary in order to provide the other controller with usable information. Such analyses of the recorded input data by the controller for processing the recorded data requires substantial computing power by the respective controller, which may impair the control process of the automation process.

SUMMARY

The application provides an improved method for operating an automation system and a data infrastructure to execute the method of operating an automation system.

EXAMPLES

A method is provided for operating an automation system comprising a first controller and at least a second controller for executing at least one automation process and for controlling a plurality of field devices, and an external data infrastructure comprising a message-distributing module for switching data communication between communication subscribers of a communication network, comprising the following steps:
  defining a first communication network and identifying the first controller and the second controller as communication subscribers of the first communication network using the message-distributing module in a first identifying step,
  sending out a first network message within the framework of a data communication between the first communication subscribers of the first communication network using the first controller to the message-distributing module of the external data infrastructure in a first sending step,
  identifying the second controller as the first communication subscriber of the communication network addressed by the first controller using the message-distributing module in a second identifying step,
  forwarding the first network message sent out by the first controller to the second controller using the message-distributing module in a forwarding step, and
  receiving the forwarded first network message using the second controller in a receiving step.

This has the technical advantage of providing an effective and efficient method for operating an automation system. By outsourcing control processes in the broader sense from the controllers of an automation system to an external data infrastructure, computer capacities of the controllers may be saved, which may subsequently be used for direct control objects of the automation process to be controlled, thus increasing the effectiveness and efficiency of the automation process.

Insofar as identifying is described in the following, identifying comprises both automatic and manual identifying. Even if automatic identifying is described in connection with identifying in the following, this description does not exclude manual identifying, but includes it into the scope of the invention.

Moreover, the provided method of operating an automation system may improve data communication between individual controllers of the automation system. For an automation system comprising a plurality of individual controllers for controlling a complex automation process consisting of various coordinated partial processes, each individual controller intended for controlling the partial processes, an effective and efficient method for data communication between the individual controllers is provided. In order to harmonize the individual partial processes of the automation process, it usually requires data communication between the controllers controlling the individual partial processes in order to exchange process data describing the state of one of the partial processes and needed for controlling another partial process.

In an automation system with a large number of controllers controlling a large number of partial processes of an automation process, not all of the partial processes usually rely on information from other partial processes. Thus, there is usually no need for each of the controllers to exchange data with all other controllers.

Moreover, data exchange or data communication between controllers may be situation-dependent, so that controllers do not communicate exclusively with the same controllers, but exchange the corresponding data exclusively with an explicitly defined group of controllers depending on the data to be transmitted. The subscribers of this group of communicating controllers may vary depending on the data to be transmitted. This may result in complex and variable communication networks between controllers of the automation system, the generation and operation of which require substantial effort.

The provided method of operating an automation system allows for simple management and unproblematic operation of such communication networks, thus ensuring effective and efficient data communication between controllers of an automation system.

For this purpose, the management or control of data communication between the controllers of the automation system is taken over by the external data infrastructure. For this purpose, the external data infrastructure has a message-distributing module that is configured to switch data communication between the controllers.

In a first identifying step, the message-distributing module defines a first communication network and automatically identifies a first controller and a second controller of the automation system as first communication subscribers of the first communication system.

The message-distributing module of the external data infrastructure recognizes all controllers of the automation system. In the event that the automation system comprises a plurality of controllers, each of which has a data connection to the external data infrastructure, the message-distributing module recognizes all controllers as potential communication subscribers and assigns them to corresponding communication networks.

For exchanging data between the controllers, the message-distributing module divides up the plurality of controllers into different communication networks, each of which differs in terms of the data to be communicated. The message-distributing module thus automatically defines a plurality of communication networks and identifies the individual controllers as communication subscribers of the different communication networks.

Individual controllers may be communication subscribers of a plurality of communication networks. Communication subscribers of a communication network may exchange data with other communication subscribers of the communication network. However, data communication with controllers that are not communication subscribers of the same communication network is not possible.

Dividing up the plurality of controllers into the plurality of communication networks thus allows for simplified data communication by ensuring that data are transmitted exclusively to the controllers for which transmission of the respective data to be transmitted is advantageous. This is achieved by enabling data transmission or data communication exclusively between controllers of the same communication network. The automatic defining the communication networks and the automatic identifying of the controllers as communication subscribers of the corresponding communication networks using the message-distributing module of the external data infrastructure avoids a time-consuming definition of the structure of the data communication between the controllers of the automation system and a corresponding programming effort for generating the communication networks and for assigning the individual controllers to the respective communication networks.

Moreover, data communication between the controllers may be simplified by avoiding explicit addressing for each communication message sent out, by which corresponding controllers are identified as recipients of the respective communication message, since only communication subscribers of the same communication network may be considered as potential recipients of the messages sent out. For such communication, e.g. a publisher/subscriber mechanism is suitable, in which messages are sent from a sender to all communication subscribers in the same communication network and received by them.

After defining the communication networks and identifying the individual controllers as communication subscribers of the respective communication networks, the first controller sends out a first network message to the message-distributing module for data communication between the first controller and the second controller. The message-distributing module receives the first network message sent out by the first controller and, on the basis of the transmitted first network message, identifies both the communication network in which this first network message is to be exchanged for data communication between the respective communication subscribers of the communication network, but also identifies the corresponding communication subscribers of the identified communication network as respective addressees of the transmitted first network message. After identifying the addressed communication subscribers of the respective communication network using the message-distributing module, the message-distributing module forwards the first network message sent out by the first controller to the communication subscribers of the identified communication network or to the respective addressed controllers. These receive the transmitted first network message, as a result of which data communication has taken place.

The provided method of operating an automation system provides for indirect data communication between controllers of the automation system, in which transmitted first network messages are transmitted to the respective addressed controllers via a message-distributing module of an external data infrastructure.

In the following, an external data infrastructure may be an external server unit that is not integrated into the internal communication network of the automation system. For example, an external data infrastructure may be an external cloud server that offers data-related services. The data-related services may include storage of the data for later use or evaluation or analysis of the data. In this way, e.g. an energy consumption, a temperature or other physical parameters of the automation system may be determined.

The computer systems of the external data infrastructure may be connected to the automation system either via a local and/or private data network or also via a worldwide and/or basically public data network, such as the Internet. External data infrastructures accessible via the Internet are offered as cloud services by various Internet groups, among others.

In the following, communication subscribers may be internal components of the automation system. Internal components may be components of the automation system that are integrated in an internal communication network of the automation system. Components, in particular with regard to communication subscribers, may be any units of the automation system that are capable of data communication. Components or communication subscribers may e.g. be controllers or, in a broader sense, data processing units such as industrial PCs, personal computers or mobile devices.

In the following, a controller is a PLC (programmable logic controller) that is used to control an automation process in an automation system. The controller may comprise a corresponding data processing unit, for example an industrial PC or a desktop computer. Alternatively, a controller may be a virtual machine or a corresponding software module that is configured to control an automation process.

In the following, a network message is a data packet or a plurality of data packets that may be transmitted between communication subscribers on the basis of a communication protocol and via which an information content may be exchanged.

According to an example, the provided method further comprises:
creating input process data, representing a state of the automation process executed by the automation system, in the field devices,
transmitting the input process data as process data from the field devices to the first controller within the framework of an exchange of process data in a transmitting step, and
sending out the process data in the first network message within the framework of data communication within the first communication network by the first controller in the first sending step.

This achieves the technical advantage that an effective and efficient method of exchanging process data between controllers of an automation system may be provided.

In a recording step, input process data are recorded by field devices that are accessed by the first controller. In the following, input process data are measurement data that are recorded by field devices of the automation system, in particular by sensors, and that represent a state of the automation process executed by the automation system.

In a transmission step, the recorded input process data are transmitted from the field devices to the first controller. The recorded process data are subsequently sent out by the controller to the respective communication subscribers of the corresponding communication network in the context of data communication within the corresponding communication network. This enables efficient and effective transmission of process data between different controllers or different communication subscribers within the automation system. This ensures effective interlinking of different automation processes.

According to an example, the external data infrastructure further comprises a control instance having an analysis module configured to analyze process data of the field devices according to predetermined analysis rules, comprising:
analyzing the process data of the first network message received via the message-distributing module using the analysis module in an analyzing step,
sending out the analyzed process data to the first controller and/or the second controller in a second network message using the message-distributing module within the framework of the data communication within the first communication network in a second sending step, and
influencing the automation process using the first controller and/or the second controller on the basis of the analyzed process data of the second network message in an influencing step.

This achieves the technical advantage that efficient, effective and detailed data communication may be provided between components of the automation system. For this purpose, the external data infrastructure may comprise a control instance with an analysis module, wherein the analysis module is configured to analyze process data of the field devices of the automation system according to predetermined analysis provisions. The process data recorded by the field devices may thus be processed by the analysis module so that information may be extracted from the pure process data which is of interest to the further controllers and the automation processes to be controlled by them.

A control instance may be an instance of a controller or of a PLC (programmable logic controller), in particular a virtual instance on the basis of a virtual machine, which is configured to execute all the functions of a controller.

In the following, a data analysis is a process for preparing process data, which turns pure process data into analyzed process data. Depending on the type of process data, data analysis may be embodied differently and comprise different analyzing steps. Data analysis requires that the analyzed process data generated by the performed data analysis differ from the original process data at least in one property.

In an analyzing step, the analysis module analyzes the process data sent out in the first network message by the first controller and generates corresponding analyzed process data. By outsourcing the data analysis to the external data infrastructure, computing capacity of the first controller may be saved that would have to be spent on the data analysis. The saved computing capacity of the first controller may be used for further control tasks of the automation process. This increases the efficiency of the control of the automation process.

After successful analysis of the process data by the analysis module, the message-distributing module creates another second network message on the basis of the analyzed process data and sends it out to the communication subscribers of the respective communication network.

The message-distributing module may send the analyzed process data back to the first controller exclusively. This case describes an outsourcing of the data analysis from the first controller to the external data infrastructure.

Alternatively, the message-distributing module may send out the analyzed process data to the second controller or, respectively, to further controllers that are communication subscribers in the communication network, so that data communication on the basis of the analyzed process data may be achieved between the first controller and the second controller or the further controllers. This achieves optimized data communication between controllers of the automation system, in that a data communication is not based exclusively on pure process data, but comprises a transmission of the information extracted by the data analysis. Due to the data analysis carried out, the information content of the process data may be individually tailored to the respectively addressed communication subscribers, so that the information content to be communicated may be maximized. This provides effective and efficient data communication.

The analyzed process data are used in an influencing step by the respective controllers of the communication network to influence the respective automation processes. Due to the data analysis and the subsequent consideration of the analyzed process data for controlling the respective automation processes via the corresponding controllers, an effective and efficient control of the automation process may be achieved.

According to an example, the external data infrastructure further comprises a control instance comprising a development module for creating a control program executable by the first controller and/or the second controller for controlling the field devices, the method further comprising:

generating a control program using the development module in a generating step, sending out the generated control program to the first controller and/or the second controller in a third network message using the message-distributing module within the framework of data communication within the first communication network in a third sending step, and carrying out the generated control program and influencing the automation process using the first controller and/or by the second controller on the basis of the generated control program in a first executing step.

This achieves the technical advantage of providing an effective, efficient, and flexible method for operating an automation system. The control instance of the external data infrastructure comprises a development module for creating a control program for controlling the automation process of the automation system.

The development module may be a development environment for programming software, in particular for programming control programs, and may have all the functions of a programming environment.

In a generating step, the development module may generate a control program that is configured to be executed by one of the controllers of the automation system to control the automation process.

After successfully generating such a control program using the development module, the message-distributing module defines a third network message on the basis of the generated control program and sends out this further third network message to the communication subscribers of the communication network within the framework of data communication within the respective communication network.

Depending on the type of the generated control program, the message-distributing module defines the respective communication network and identifies the corresponding communication subscribers in such a way that only the communication subscribers, particularly the controllers for which the generated control program is intended, are addressed by the transmitted third network message. Thus, a simplified provision of controllers or components of the automation system with corresponding control programs may be achieved.

The message-distributing module is configured to group the communication subscribers into corresponding communication networks depending on the message to be sent, wherein the communication networks or the assignment of communication subscribers to corresponding networks may be embodied in a flexible manner. The message-distributing module may e.g. generate new communication networks for each message to be sent, with the communication subscribers being grouped in the generated communication networks in such a way that it is ensured that the messages sent out are sent to the communication subscribers addressed for such messages and are received by them.

By simply addressing the respective controllers by automatically defining the corresponding communication networks by the message-distributing module, a time-consuming installation of generated control programs on the respective controllers for which the generated control program is intended may be avoided.

Centralized generating of the control programs in the external data infrastructure and sending out the generated control programs to the respective controllers using the message-distributing module means that a plurality of controllers may be provided with corresponding control programs without excessive programming or installation effort. After receiving the transmitted third network messages, the respective controllers may independently install the corresponding control programs generated for them and, in an executing step, execute the respectively generated control programs and influence the automation process, or the respective partial processes, on the basis of the generated control program. This provides an efficient and effective method for providing control programs for controllers of the automation system.

According to an example, the external data infrastructure further comprises a control instance comprising an execution module for executing a control program for controlling the field devices of the automation system, the method further comprising:

executing a control program and generating output process data using the execution module in a second executing step, the output process data comprising control instructions to the field devices for controlling the field devices on the basis of the control program, sending out the generated output process data to the first controller and/or the second controller in a fourth network message using the message-distributing module within the framework of data communication within the first communication network in a fourth sending step, and influencing the automation process on the basis of the generated output process data of the generated control program by the first controller and/or by the second controller in a control step.

This achieves the technical advantage that an effective and efficient method for operating an automation system may be provided, in which centralized control of the automation system is allowed for. For this purpose, a control instance of the external data infrastructure comprises an execution module for executing a control program for controlling the automation system. In a second executing step, the execution module executes a control program and generates output process data comprising control instructions to the field devices for controlling the field devices. The control instructions are in this context adjusted to the respective field devices.

After generating the output process data using the execution module, the message-distributing module generates a fourth network message on the basis of the generated output process data and sends it out to the respective communication subscribers of the corresponding communication network. On the basis of the generated output process data, the respective addressed communication subscribers or the addressed controllers influence the automation process and control the corresponding field devices of the automation system on the basis of the generated control program. Central control of the automation process may thus be achieved.

According to an example, the automation system comprises at least a third controller, and wherein the method further comprises: defining a second communication network and identifying the third controller and the first controller and/or the second controller as second communication subscribers of the second communication network using the message-distributing module in a third identifying step, wherein data communication is performed exclusively between first communication subscribers of the first communication network or between second communication subscribers of the second communication network.

This achieves the technical advantage that flexible data communication between controllers of the automation system may be provided. In an automation system with a plurality of controllers that exchange data in the form of data communication to synchronize individual partial processes of an automation process, wherein, however, the data exchange between controllers depends on the information to be exchanged in such a way that different controllers are addressed depending on the information to be exchanged, a simplified addressing and associated simplified data communication may be achieved.

In a plurality of controllers, the message-distributing module defines corresponding communication networks and automatically identifies all communication subscribers of the respective communication networks. Various controllers may each be communication subscribers of different communication networks. Data communication with further communication subscribers of the same communication network is enabled for communication subscribers of a communication network. However, data communication with communication subscribers of other communication networks is not possible. Different communication networks may differ in terms of the information to be transmitted between the respective communication subscribers.

For example, the message-distributing module may be embodied as a message broker and data communication between the controllers of the automation system may be defined on the basis of a publisher/subscriber mechanism. Sent-out network messages may be provided with a topic that describes the information content of the sent-out network message. Controllers of the automation system may subscribe to any topic for data communication, via which the corresponding controllers for messages of the respective topic may be identified as potential recipients. The message-distributing module may define the respective data communication networks on the basis of the available topics, so that a communication network is provided for the exchange of network messages of a specific topic or a plurality of specific topics.

The communication subscribers of a respective communication network here result from the plurality of controllers that have subscribed to the respective topic or the respective plurality of topics. By defining the various communication networks and by identifying the respective communication subscribers of the various communication networks using the message-distributing module, reliable data communication may be achieved in which sent-out network messages are forwarded exclusively to the communication subscribers or, respectively, to the controllers of the automation system that are intended as recipients for network messages of the type of the transmitted network message.

A network message may thus be sent out by one of the controllers of the automation system within the framework of a data communication between communication subscribers on the basis of a publisher-subscriber model. As a message broker, the message-distributing module is aware of all the controllers participating in the data communication and may thus forward the network message sent out to the controllers that have subscribed to network messages of the type of the sent-out network message or network messages of the topic of the network sent-out message. For this purpose, the message-distributing module defines different communication networks having different communication subscribers, wherein communication subscribers of a communication network have subscribed to messages of the same topics.

This allows for simplified data communication between a plurality of controllers of an automation system.

A data infrastructure for carrying out the provided method for operating an automation system is provided, wherein the data infrastructure may be embodied as an external component of the automation system and may be connected to internal components of an automation system, and wherein the data infrastructure comprises:

a message-distributing module for switching data communication between communication subscribers of a communication network of the automation system, wherein the message-distributing module is arranged to define at least one communication network and to identify components of the automation system as communication subscribers of the communication network, receiving network messages transmitted by the communication subscribers within the framework of data communication between the communication subscribers within the communication network, and identifying addressed communication subscribers of the communication network, and forwarding the received network messages to the identified communication subscribers.

This achieves the technical advantage that a powerful and widely usable data infrastructure may be provided which is embodied to carry out the provided method of operating an automation system. The data infrastructure may be embodied as an external data infrastructure for an automation system and may be connected to internal components, e.g. controllers, of the automation system.

In order to carry out the provided method for operating an automation system, the data structure comprises a message-distributing module, which is configured to define communication networks and automatically identify components of the automation system as communication subscribers of the communication network. For this purpose, the message-distributing module may carry out the steps described above.

The message-distributing module is further configured to switch data communication between the network subscribers of a communication network by receiving sent-out network messages via the message-distributing module, identifying the respective addressed communication subscribers, and forwarding the received network messages to the identified communication subscribers. For this purpose, the message-distributing module may perform the steps described above.

According to an example, the message-distributing module is configured to define a plurality of communication networks from a plurality of components of the automation system and to identify the corresponding components as communication subscribers of one or more communication networks, wherein data communication is enabled exclusively among communication subscribers of the same communication network.

This achieves the technical advantage that a flexible and widely applicable data infrastructure may be provided that is capable of switching data communication between a plurality of components of an automation system. To this end, the data infrastructure is configured to define, among the plurality of components of the automation system, a plurality of communication networks with a plurality of communication subscribers, with the message-distributing module being configured to automatically identify the relevant communication subscribers for each communication network. The components of the automation system may in this case be controllers of the automation system. Alternatively, the communication subscribers may be other data processing units, such as personal computers of a control level of the automation system, or mobile devices. By dividing up the plurality of components of the automation system into a plurality of different communication networks, the message-distributing module of the data infrastructure is able to switch a data communication between the communication subscribers of the communication networks according to the steps described above.

Alternatively, the communication subscribers may also be controllers of other automation systems. In this case, the message-distributing module would be able to assign the individual controllers to the respective automation systems and define corresponding communication networks to ensure that only controllers of one automation process communicate with each other, while controllers of other automation systems would be excluded from data communication. This would be of particular interest in the event that the external data infrastructure is embodied as a cloud sever and the services may be used by several different users, especially operators of different automation systems. By dividing up the different controllers into different communication networks, while avoiding that controllers of different automation systems are combined in identical communication networks, an in-system data communication may be achieved and it may be prevented that data are unintentionally forwarded to data processing units of other automation systems.

According to an example, the data infrastructure further comprises a control instance having an analysis module, wherein the analysis module is configured to analyze process data of the components of the automation system sent via at least one first network message, and wherein the message-distributing module is configured to send out the analyzed process data in at least a second network message to the communication subscribers of the communication network.

This achieves the technical advantage that a flexible and widely applicable data infrastructure may be provided which, in addition to switching data communication between components of the automation system, is configured to perform data analysis of process data of the automation system.

For this purpose, the data infrastructure comprises a control instance having an analysis module, which is configured to evaluate process data of the automation system on the basis of predetermined analysis procedures and to generate analyzed process data. The message-distributing module of the data infrastructure is further set up to generate corresponding second network messages on the basis of the analyzed process data and to send these out to the respective communication subscribers for which these analyzed process data are intended. This makes it possible for the data infrastructure to provide complex data communication between controllers of the automation system that goes beyond an exchange of process data. For this purpose, the analysis module and the message-distributing module may perform the steps described above.

According to an example, the control instance further comprises a development module, the development module being configured to generate a control program for controlling the automation process, and wherein the message-distributing module is configured to transmit the generated control program in a third network message to the communication subscribers of the communication network.

This achieves the technical advantage that a flexible and widely applicable data infrastructure may be provided, which comprises a control instance with a development module that is configured to generate a control program for controlling an automation process of the automation system. The development module may be a programming environment via which a control program for controlling the automation process may be generated, which may be executed by the controllers of the automation system and on the basis of which field devices of the automation system may be accessed. For this purpose, the development module may perform the steps described above.

According to an example, the control instance further comprises an execution module for executing a control program for controlling the automation process, wherein the execution module is configured to execute a control program and to generate output process data, wherein the output process data comprise control instructions to the components of the automation system for controlling the automation process on the basis of the control program, and wherein the message-distributing module is configured to transmit the generated output process data in a fourth network message to the communication subscribers of the communication network.

This achieves the technical advantage that a flexible and widely usable data infrastructure may be provided, which comprises a control instance with an execution module, the execution module being configured to execute a control program for controlling an automation process of the automation system and to generate output process data comprising control instructions to the components of the automation system. Thus, the control instance is able to control automation processes of the automation system via the execution module. Thus, the provided data infrastructure may provide a centralized control of an automation system, in which a control program or a plurality of control programs are executed by a corresponding control instance and corresponding control instructions are generated. The execution module may perform the steps described above for this purpose.

According to an example, the data infrastructure further comprises an input module for inputting prompts to the control instance, the input module being connectable to the control instance and enabling a user:
to view an analysis process of the analysis module and/or to influence it by a corresponding prompt,
to generate the control program via a corresponding prompt to the development module, and
to influence the control of the automation process and/or view process data of the automation process.

This achieves the technical advantage that a flexible and broadly applicable as well as easy-to-operate data infrastructure may be provided, which is configured to execute the provided method for operating an automation system. For simplified operability of the data infrastructure, the data infrastructure further comprises an input module that may be connected to the control instance of the data infrastructure. Via the input module, a user of the data infrastructure is able to view or influence operations of the analysis module. Via the input module, the user is able to monitor the data analysis of the automation system process data performed by the analysis module and to view the generated analyzed process data. Furthermore, the user is able to control the analysis process of the analysis module and to influence the analysis process performed by the analysis module, thus shaping the analysis process accordingly. The users are thus able to analyze the recorded process data according to their specifications using corresponding inputs via the input module.

The user is further able to generate the control program via a corresponding prompt to the development module. The user has access to the development module via the input module, which is connected to the control instance, and may generate the control program via corresponding input via the input module. As mentioned above, the development module may be implemented as a programming environment. The input module thus allows the user to access the development module configured as a programming environment, and thus allows the user to perform programming of a control program via the input module. In addition to a control program, the user may generate other software components by making appropriate inputs to the input module within the development module.

Furthermore, the user is able, via the input module, to influence the control of the automation process and/or view process data. By making a corresponding input to the input module, the user may e.g. stop or start the execution of a control program and thus influence the control of the automation process. Furthermore, the user may install newly generated control programs via corresponding inputs to the input module and request the controller of the automation system to execute the control program and thus intervene in the control of the automation system.

According to an example, the data infrastructure is configured as a cloud server, wherein the input module is embodied as a website via which a user may dial into the data infrastructure, and wherein the input module may be accessed on a computer unit, in particular a personal computer or a mobile device.

This achieves the technical advantage that a flexible and widely deployable data infrastructure may be provided. By embodying the data infrastructure as a cloud server, the data infrastructure may be used for a variety of different automation systems. In this context, the input module may be embodied as a website via which a user may dial into the data infrastructure and use the functions described above to influence the control of the automation system. The input module embodied as a website may be executed on any data processing unit, in particular on a personal computer or a mobile device, and be accessed by the user. The user is thus able to dial into the data infrastructure e.g. via their smartphone or tablet computer and thus influence the control of the automation system. This provides a high degree of flexibility, enabling a user to influence the control of an automation system from any location. The data infrastructure embodied as a cloud server may be connected to the components of the automation system via an Internet connection. This allows for a decentralized arrangement of the data infrastructure. By designing the input module as a website that may be accessed from any computer device and via which the functions of the input module described above may be executed, it is possible to view and influence the control of the automation system at any location worldwide and at any time. This provides a high degree of flexibility in the control of the automation system.

By embodying the data infrastructure as a cloud server, it may be achieved that the data infrastructure may be used to control a plurality of automation systems. Here, a plurality of control instances and a plurality of message-distributing modules may be set up on the data infrastructure, each of which serves to control an automation system.

Via the input module embodied as a website, different users may dial into the cloud server via individualized access instances and gain access to a personalized control instance or to a plurality of control instances in order to be able to influence or view the control processes of the individual automation systems. This in turn provides a high degree of flexibility, in that the data infrastructure provides a basis for controlling a plurality of different and unassociated automation systems. This may e.g. be of interest to large corporations that operate a number of automation systems, the control or monitoring of which may be assigned to the control on the centralized data infrastructure. This may reduce the complexity of such companies and increase productivity.

Alternatively, the described services of the cloud server may be used by a plurality of different operators of automation systems, who may influence or view control processes of the automation systems operated by the operators in parallel via the cloud server and individualized control instances.

BRIEF DESCRIPTION OF THE DRAWINGS

The invention is explained in more detail in the following figures. In each case, schematic illustrations show.

DETAILED DESCRIPTION

Figure 1:
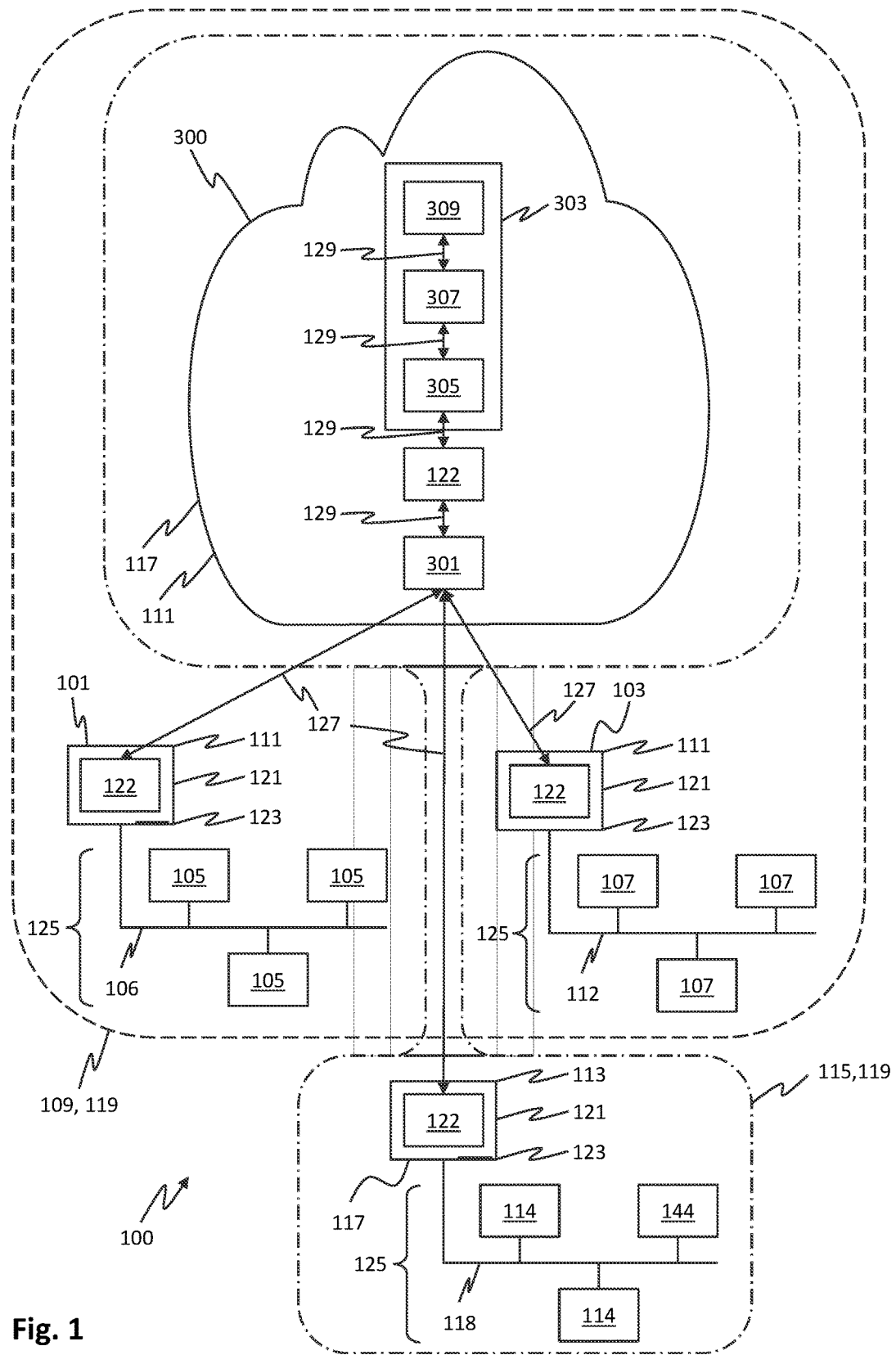
FIG. 1 a schematic depiction of an automation system according to an example.

FIG. 1 shows a schematic diagram of an automation system 100 according to an example.

FIG. 1 shows an exemplary example of an automation system 100, which serves to illustrate individual elements of the automation system 100 acted upon by the method 200 for operating an automation system 100. The automation system 100 shown in FIG. 1 is for illustrative purposes only, and various elements of the automation system 100 may differ from the example shown in FIG. 1.

The automation system 100 of FIG. 1 comprises a first controller 101, which is connected to first field devices 105 via a first bus system 106. The automation system 100 further comprises a second controller 103, which in turn is connected to second field devices 107 via a second bus system 112. Moreover, the automation system 100 comprises a third controller 113 that is connected to third field devices 114 via a third bus system 118. The number of controllers 123 shown, as well as the number of field devices 125 shown, is merely exemplary and may be modified as desired. The first controller 101, the second controller 103, and the third controller 113 are each connected to an external data infrastructure 300 via an external data network 127.

The external data infrastructure 300 comprises a message-distributing module 301 and a control instance 303. The control instance 303 in turn comprises an analysis module 305, a development module 307 and an execution module 309.

For data communication between the controllers 123 and the external data infrastructure 300, the first controller 101, the second controller 103 and the third controller 113 each have a router 122, via which network messages may be sent to and received from the external data infrastructure 300 via the external data network 127 in the form of data packets. For data communication, the external data infrastructure 300 also comprises a router 122 via which corresponding data packets may be received from or sent out to the controllers 123.

The individual modules of the external data infrastructure 300 are interconnected via an internal data network 129, allowing for internal data communication between the modules of the external data infrastructure 300.

Moreover, in FIG. 1 the first controller 101, the second controller 103, and the third controller 113 are divided into two communication networks 119. Thus, the first communication network 109 comprises the first controller 101, the second controller 103, and the external data infrastructure 300, each of which thus represents first communication subscribers 111 of the first communication network 109.

Furthermore, a second communication network 115 is defined in FIG. 1, which only comprises the third controller 113 and the external data infrastructure 300 as second communication subscribers 117. Dividing up the controllers 123 into a first communication network 109 and a second communication network 115 allows for the message-distributing module 301 to simplify the switching of a data communication between the controllers 123. A data communication is enabled exclusively between communication subscribers 121 of the same communication network 119.

In the example shown in FIG. 1, the external data infrastructure 300 is configured as a cloud server. The external data network 127, via which a data connection between the controllers 123 and the external data infrastructure 300 is enabled, may be embodied as an Internet connection in this context, so that corresponding network messages to be exchanged in the context of data communication between the controllers 123 and the external data infrastructure 300 structurally correspond to corresponding communication protocols.

Data communication between the controllers 123 of the automation system 100 may be organized on the basis of a publisher/subscriber architecture. In this case, the message-distributing module 301 may be embodied as a message broker that is able to communicate received network messages to the correspondingly addressed communication subscribers 121 of the respective communication networks 119. Individual network messages may herein be embodied in such a way that they are identified by a topic, on the basis of which an information content of the respective network message may be read. Individual communication subscribers 121, in particular the illustrated controllers 123 and the external data infrastructure 300, may subscribe to messages of any topic or different topics as subscribers. Based on the topics subscribed to, the message-distributing module 301 may group the individual controllers 123 into corresponding communication networks 119, so that controllers 123 with identical topics subscribed-to are grouped into a communication network 119. Controllers 123 that have not subscribed to the respective topic of the previously defined communication network 119 are thus not communication subscribers 121 of the respective communication network 119.

By defining individual communication networks 119 and assigning communication subscribers 121 to individual communication networks 119, the message-distributing module 301 may distribute access rights that provide which of the communication subscribers 121 receives which network messages or, respectively, to which data communications, particularly to which communication networks 119 access is granted.

The field devices 125 of the controllers 123 shown in FIG. 1 may include actuators as well as sensors and may be capable of recording process data describing a state of the automation process controlled by the respective controller 123. The first bus system 106, the second bus system 112 and the third bus system 118 may be any field-bus systems and may enable data communication on the basis of corresponding communication protocols between the respective controller 123 and the corresponding field devices 125.

Data communication between the controllers 123 and the external data infrastructure 300 via the external data network 127 may be carried out on the basis of an MQTT protocol. The individual network messages may thus be embodied in the form of corresponding MQTT telegrams. Via the topic unit provided in the MQTT telegram, each network message sent out may be assigned to a corresponding communication network having communication subscribers, each of which is classified as a subscriber to network messages of that particular topic.

As an alternative to the example shown in FIG. 1, the third controller 113 with the third field devices 114 and the third bus system 118 may be part of a further automation system that is not part of the automation system 100. In this case, by dividing up the communication subscribers 121 into the two communication networks 119, it is provided that no data transmission takes place between communication subscribers 121 of different automation systems. This is of particular interest in the case where the external data infrastructure 300 is embodied as a cloud server and services of the cloud server are used by different operators of automation systems.

Alternatively, the third controller 113 and the third field devices 114 may be part of the automation system 100, which, however, do not contribute to the automation process controlled by the first controller 101 and the second controller 103. Thus, data communication between the first controller 101 and the third controller 113 or between the second controller 103 and the third controller 113 is not provided.

As already mentioned, the external data infrastructure 300 may offer data-based services as a cloud server. For this purpose, the external data infrastructure 300 may run a data service that e.g. processes stores, analyzes, or otherwise evaluates the process data transmitted to the external data infrastructure 300. The external data infrastructure 300 may also provide several of the data services. The external data infrastructure 300 may be configured to provide the process data or the results of the analysis or processing via the external data network 127 to another application, e.g. an application running on another computer or mobile terminal. On the external data infrastructure 300, the process data may also be analyzed or processed using machine learning or data-mining methods.

The external data infrastructure 300 may also be adapted to provide process data as output process data. The output process data may e.g. be created on the basis of the input process data previously transmitted by the first controller 101 in order to influence the state of the automation process. In this way, e.g. control functions of the automation process may be processed on the external data infrastructure 300. However, the output process data may also have been created on the basis of data provided to the external data infrastructure 300 by other components, e.g. by further controllers 123 via the external data network 127.

The output process data may be retrieved from the external data infrastructure 300 within the framework of process data exchange between the external data infrastructure 300 and the controller 123. Hereupon, the process data are transmitted via the external data network 127 to the controller 123 for receipt.

For example, the output process data may be provided by the external data infrastructure 300 to drive the field devices 125.

The external data network 127 may e.g. be a wired network, such as an Ethernet network, or a radio-based network. The external data infrastructure 300 may be on the basis of a local computer system located in the vicinity of the automation system 100. In this case, the external data network 300 may comprise or consist of e.g. a local area network (LAN). The external data infrastructure 300 may also be based on a remote computer system. In this case, the external data network 127 may also comprise the Internet, so that the external data infrastructure 300 may in principle be arranged globally.

Process data may be exchanged between the controller 123 and the external data infrastructure 300 or the control instance 303 via a mutual exchange of network messages. The exchange of network messages may be coordinated 301 by a message-distributing module 301. In this regard, the network messages do not have to be exchanged directly between the control instance 303 or a controller receiving the process data. Rather, the controller 123 and the control instance 303 may each exchange the network messages containing the process data with the message-distributing module 301, which then handles the forwarding of the network messages to the respective recipient.

Thus, the controllers 123 and the control instance 303 are not directly coupled to each other, but only indirectly communicate with each 301 other via the message-distributing module 301. This allows for temporally and spatially decoupled operation of the controllers 123 as transmitters of the network messages and the receivers of the network messages. The message-distributing module 301 may be embodied to enable platform- and operating system-independent exchange of the network messages.

The message-distributing module 301 may provide a message queue for the network messages. It may also include a message broker that validates, transforms and/or forwards the network messages. The message-distributing module 301 may run as a software application on the external data infrastructure 300. The message-distributing module 301 may e.g. be a so-called message-oriented middleware. The exchange of the network messages containing the process data with the message-distributing module 301 may e.g. take place via the MQTT protocol or the AMQP protocol.

Figure 2:
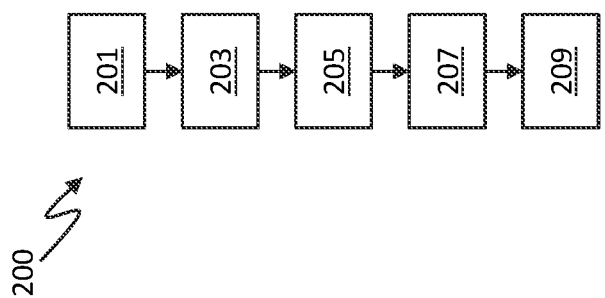
FIG. 2 a flow chart of a method for operating an automation system according to an example.

FIG. 2 shows a flowchart of a method 200 for operating an automation system 100 according to an example.

The method 200 for operating an automation system illustrated in FIG. 2 relates to an automation system 100 according to FIG. 1, but the method 200 is not intended to be limited thereto. Details of the automation system 100 may differ from the automation system 100 shown in FIG. 1.

The method 200 for operating an automation system 100 relates to an automation system 100 having at least a first controller 101 and a second controller 103 for executing an automation process and for controlling a plurality of field devices 125, and an external data infrastructure 300 having a message-distributing module 301 for switching a data communication between communication subscribers 121 of a communication network 119.

In the example shown in FIG. 2, the method 200 comprises the steps of:
defining a first communication network 109 and identifying the first controller 101 and the second controller 103 as first communication subscribers 111 of the first communication network 109 using the message-distributing module 301 in a first identifying step 201,
sending a first network message within the framework of a data communication between the first communication subscribers 111 of the first communication network 109 via the first controller 101 to the message-distributing module 301 of the external data infrastructure 300 in a first sending step 203,
identifying the second controller 103 as the first communication subscriber 111 of the first communication network 109 addressed by the first controller 101 via the message-distributing module 301 in a second identifying step 205,
forwarding the first network message sent out by the first controller 101 to the second controller 103 via the message-distributing module 301 in a forwarding step 207, and
receiving the forwarded first network message via the second controller 103 in a receiving step 209.

In the first identifying step 201, the message-distributing module 301 defines a first communication network 109 and automatically identifies the first controller 101 and the second controller 103 as first communication subscribers 111 of the first communication network 109. Embodied as a message broker, the message-distributing module 301 automatically recognizes all components or controllers 123 of the automation system 100. On the basis of the topic divisions of the possible network messages in the context of a data communication between the controllers 123 of the automation system 100, which are also known to the message-distributing module 301, the message-distributing module 301 is able to group the known controllers 123 in corresponding communication networks 119, so that the controllers 123 are grouped in a communication network 119, which have subscribed to network messages with identical topics as addressees.

By defining individual communication networks 119 and assigning communication subscribers 121 to individual communication networks 119, the message-distributing module 301 may distribute access rights that provide which of the communication subscribers 121 receives which network messages or to which data communications, in particular to which communication network 119 access is granted.

Controllers 123 that are detected via the message-distributing module 301 but have not subscribed to any of the known topics of the possible network messages are not assigned to any of the defined communication networks 119. Such controllers 123 are thus excluded from data communication with other controllers 123. In FIG. 1, the third controller 113 corresponds to such a controller that has not subscribed to any topics of the network messages of the first communication network 109 and is thus not a first communication subscriber 111 of the first communication network 109.

Such exclusion of controllers 123 from defined communication networks 119 may e.g. occur for controllers 123 that are not components of the existing automation system 100. Such controllers 123 may e.g. be components of another automation system. In the case of the external data infrastructure 300 being embodied as an external cloud server, this may particularly be the case if the further controller is a component of a further automation system. In FIG. 1, the third controller 113 may in particular be a component of a different automation system.

After defining the first communication network 109 and automatically identifying the first communication subscribers 111, for data communication between the first communication subscribers 111 in the first communication network 109, the first controller 101 sends out first network messages to the message-distributing module 301 in the first sending step 203. The sent-out first network messages are addressed to the first communication subscribers 111 of the first communication network 109.

After receiving the first network messages via the message-distributing module 301, the message-distributing module 301 identifies the first communication subscriber 111 of the first communication network 109 addressed in the transmitted first network message. This may be inferred in particular from the topic information contained in the transmitted first network message. Within a communication network 119, all communication subscribers 121 contained in the communication network 119 may be addressed by transmitted first network messages. Alternatively, only certain communication subscribers 121 of a communication network 119 may be addressed by sent-out first network messages.

After identifying the addressed first communication subscriber 111 in the second identifying step 205 via the message-distributing module 301, the latter forwards the received first network message to the addressed first communication subscriber 111 of the first communication network 109 in a forwarding step 207. In this example, the message-distributing module 301 acts exclusively as a distributor of the first network messages sent out by the communication subscribers 121 of the respective communication network 119.

In a receiving step 209, the addressed first communication subscriber 111 of the first communication network 109 receives the first network message transmitted by the first controller 101, thereby completing the targeted data communication.

In the example described herein, which provides only a first controller 101 and a second controller 103 as first communication subscribers 111 of the first communication network 109, network messages are exchanged exclusively between the first controller 101 and the second controller 103. Alternatively, a communication network 119 may have a plurality of communication subscribers 121, each of which is arranged to send out network messages to the other communication subscribers of the communication network and to receive network messages addressed to them accordingly.

In the example described herein, the external data infrastructure 300, at least, however, the message-distributing module 301 is a communication subscriber 121 of the respectively defined communication networks 119.

Figure 3:
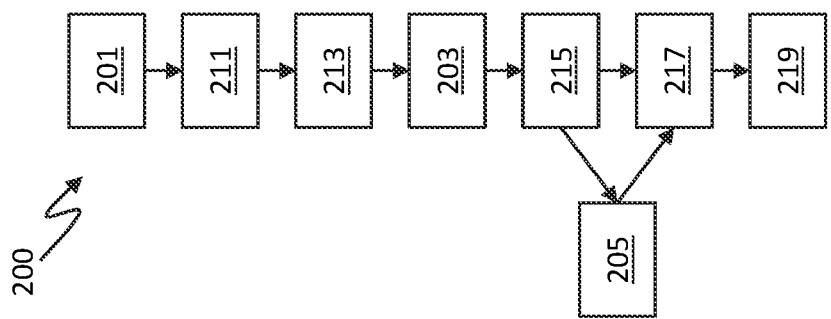
FIG. 3 a flow chart of a method for operating an automation system according to a further example.

FIG. 3 shows a flowchart of a method 200 for operating an automation system 100 according to a further example.

The example of the method 200 shown in FIG. 3 builds on the method steps of method 200 in the example shown in FIG. 2. The method flow of method 200 shown for FIG. 2 will not be explained further below.

As in the example in FIG. 2, in the present example in FIG. 3, as well, data communication between communication subscribers 121 is initiated by defining a first communication network 109 and automatically identifying the first controller 101 and the second controller 103 as first communication subscribers 111 in the first identifying step 201.

Subsequently, in a recording step 211, input process data representing a state of the automation process controlled by the first controller 101 is recorded by the first field devices 105. Such input process data may be measured values from sensors. In a transmission step 213, these recorded input process data are transmitted from the first field devices 105 to the first controller 101. In the example of the automation system 100 shown in FIG. 1, this is done via the first bus system 106 on the basis of a corresponding bus protocol.

The process data received by the first controller 101 is subsequently sent-out in a first sending step 203 by the first controller 101 in a first network message.

Differing from the example in FIG. 2, the first network message sent out by the first controller 101 is not forwarded directly to the addressed communication subscriber via the message-distributing module 301, but the first network message received via the message-distributing module 301 is forwarded to the analysis module 305 of the control instances 303 via the internal data network 129 of the external data infrastructure 300. In an analyzing step 215, the analysis module 305 performs a data analysis of the process data of the first field devices 105 included in the first network message. The performed data analysis may be adapted to the structure of the process data and may be variable according to the information content of the recorded process data to be extracted by the data analysis. Due to the data analysis carried out, the analysis module 305 generates analyzed process data.

In a second sending step 217, the message-distributing module 301 composes a second network message on the basis of the analyzed process data and transmits it to the first controller 101 and/or to the second controller 103. In contrast to the example discussed herein, if more than two first communication subscribers are grouped in the first communication network 109, the message-distributing module 301 may transmit the second network message to any number of addressed first communication subscribers 111. In this case, the message-distributing module 301 may identify the respectively addressed first communication subscribers 111 of the first communication network 109 in the second identifying step 205 described above. After identifying the addressed first communication subscribers 111, the message-distributing module 301 transmits the second network message to the identified first communication subscribers 111 in the second transmission step 217.

After receipt of the second network message by the addressed first communication subscribers 111, in the present example the first controller 101 and/or second controller 103, the addressed first communication subscribers 111 take the analyzed process data of the second network message into account in order to control the automation process.

In the case that the second network message is sent exclusively to the first controller 101, an analysis process of the recorded process data of the first field devices 105 may be outsourced to the external data infrastructure 300 by the method 200. In the case in which the second network message is sent out to the second controller 103, a data communication on the basis of the analyzed process data may be implemented between the first controller 101 and the second controller 103.

Figure 4:
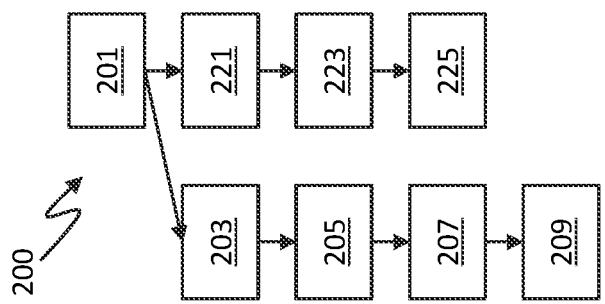
FIG. 4 a flow chart of a method for operating an automation system according to a further example.

FIG. 4 shows a flowchart of a method 200 for operating an automation system 100 according to a further example.

The example in FIG. 4 is on the basis of the example in FIG. 2 and comprises all the method steps of the example in FIG. 2. These steps will not be discussed again if unchanged.

After defining the first communication network 109 and automatically identifying the first controller 101 and the second controller 103 as first communication subscribers 111 in the first identifying step 201, a control program for controlling the first controller 101 and/or the second controller 103 is generated in a generating step 221 by the development module 307 of the control instance 303 of the external data infrastructure 300. If the development module 307 is configured as a programming environment, the generating step 221 may comprise programming a control program by a user of the development module 307.

After successfully generating of the control program via the development module 307, the generated control program is forwarded to the message-distributing module 301 via the internal data network 129. Thereupon, the message-distributing module 301 generates a third network message on the basis of the generated control program and sends out this third network message to the first controller 101 and/or to the second controller 103 as addressed first communication subscribers 111 of the first communication network 109 in a third sending step 223. If, contrary to the example described herein, a plurality of first communication subscribers 111 are combined in the first communication network 109, the message-distributing module 301 may send out the generated third network message to a plurality of the first communication subscribers 111 in the third sending step 223.

For this purpose, the message-distributing module 301 identifies the first communication subscribers 111 of the first communication network 109 for which the generated control program is intended and accordingly addresses the third network message to the identified first communication subscribers 111. Alternatively, the third network message may be sent to all first communication subscribers 111. Alternatively, another communication network 119 having communication subscribers 121 may be defined to which the third network message is to be sent.

After receiving the third network message via the addressed first communication subscribers 111 in the present example by the first controller 101 and/or the second controller 103, the addressed first communication subscribers 111 execute the generated control program of the third network message and control the respective automation process on the basis of the generated control program. This may include installing the generated control program and replacing an original control program by the generated control program via the respective addressed first communication subscribers 111, in the present example by the first controller 101 and/or the second controller 103.

The generation of a control program by the development module 307 described herein may be performed in parallel with a data communication between first communication subscribers 111 according to the example described with respect to FIG. 2.

In parallel, data communication may be performed according to the examples in FIG. 2 or FIG. 3.

Figure 5:
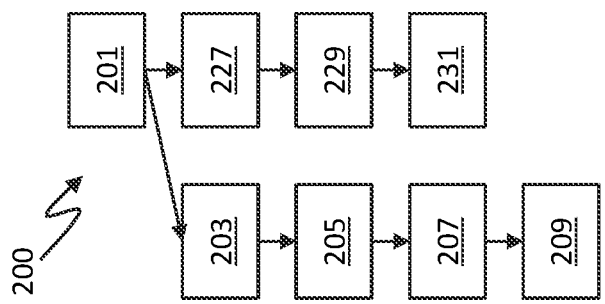
FIG. 5 a flow chart of a method for operating an automation system according to a further example.

FIG. 5 shows a flowchart of a method 200 for operating an automation system 100 according to a further example.

The example of FIG. 5 is on the basis of the example of FIG. 2 and comprises all the method steps of the example of FIG. 2. These steps will not be discussed again if unchanged.

After successfully defining the first communication network 109 and automatically identifying of the first controller 101 and the second controller 103 as first communication subscribers 111 in the first identifying step 201, a control program is executed and output process data are generated in a second executing step 227 by the execution module 309 of the control instance 303.

The output process data comprise control instructions to the field devices 125 for controlling the automation process. The generated control instructions of the output process data may correspond to control instructions issued by the first controller 101 or the second controller 103 for controlling the first field devices 105 or the second field devices 107. Thus, the generated control instructions of the output process data may be directly applied to the first field devices 105 or the second field devices 107 for controlling the automation process. Alternatively, the generated control instructions of the output process data may be control instructions to the first controller 101 or the second controller 103, so that for controlling the first field devices 105 via the first controller 101 or for controlling the second field devices 107 via the second controller 103 an additional conversion of the generated control instructions of the output process data by the first controller 101 or the second controller 103 is necessary and direct control of the first field devices 105 or the second field devices 107 by the generated control instructions of the output process data is not possible.

After executing the control program and generating the output process data using the execution module 309, the generated output process data are transmitted to the message-distributing module 301 via the internal data network 129. Subsequently, the message-distributing module 301 generates a fourth network message on the basis of the output process data and sends out the fourth network message to the first controller 101 and/or to the second controller 103 in a fourth sending step 229. In the event that a plurality of first communication subscribers 111 are grouped in the first communication network 109, the message-distributing module 301 may transmit the fourth network message to a plurality of first communication subscribers 111. For this purpose, the message-distributing module 301 may identify the first communication subscribers 111 for which the generated output process data of the fourth network message are intended.

After receiving the fourth network message via the addressed first communication subscribers 111, in the present example by the first controller 101 and/or the second controller 103, the first controller 101 and/or the second controller 103 executes the corresponding control instructions of the generated output process data and influences the automation process to be controlled on the basis of the generated output process data. Thus, control of the automation system 100 or the automation process executed by the automation system 100 may be achieved by the control instance 303 arranged in the external data infrastructure 300.

The method 200 has been described in the examples of FIG. 2, FIG. 3 and FIG. 4 with reference to the automation system 100 shown in FIG. 1. However, the method 200 is not intended to be limited to the automation system 100 shown in FIG. 1. Rather, the method 200 may be applied to any automation systems 100, in particular with a plurality of controllers 123 or a plurality of further communication subscribers, which are e.g. embodied as computers of control levels of the automation systems 100 or other data processing units 139.

Figure 6:
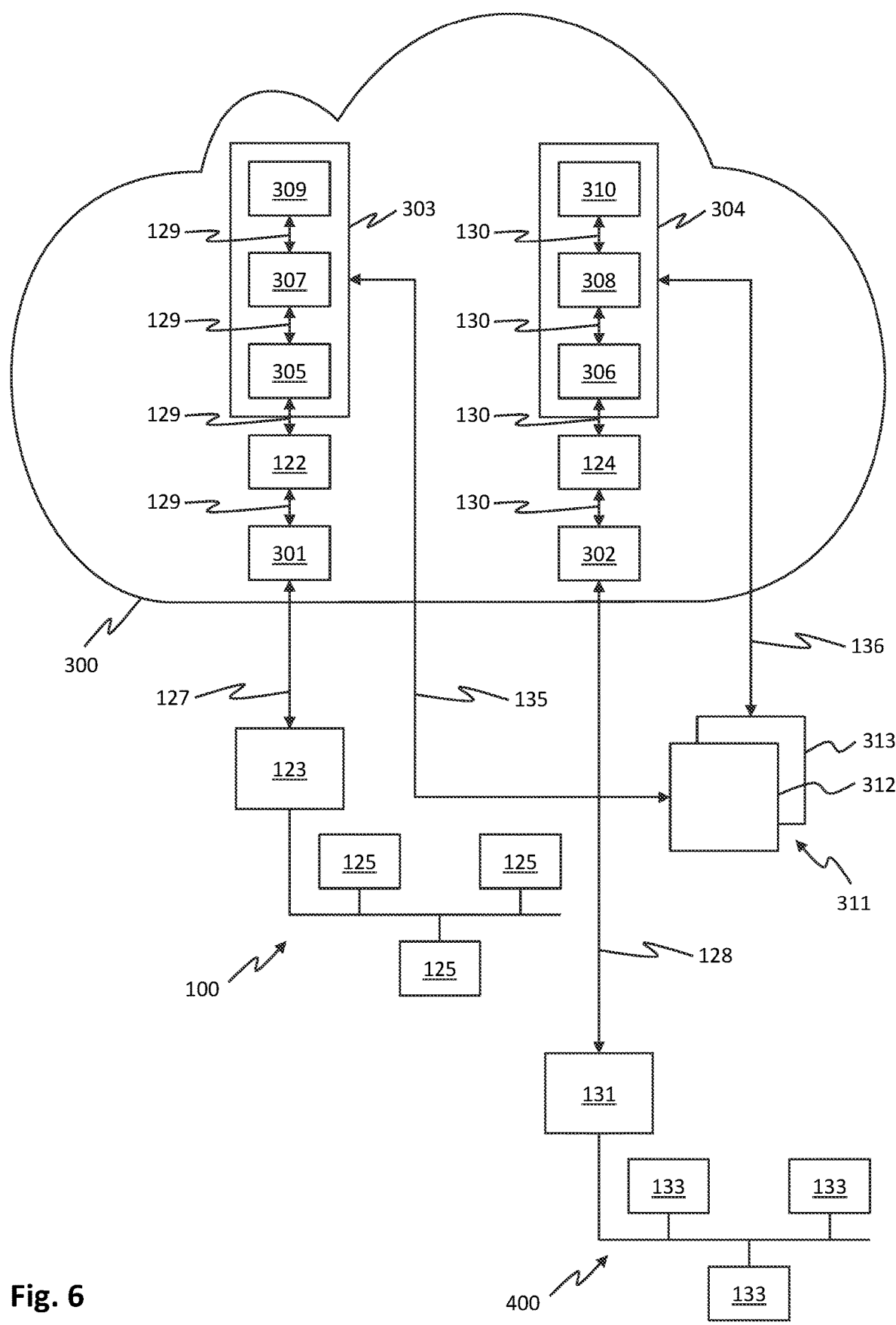
FIG. 6 a schematic depiction of a data infrastructure according to an example.

FIG. 6 shows a schematic diagram of a data infrastructure 300 according to an example.

In FIG. 6, the external data infrastructure 300 is shown in the external cloud server example. The external data infrastructure 300 comprises the message-distributing module 301 and the control instance 303 including the analysis module 305, the development module 307, and the execution module 309. Furthermore, the external data infrastructure 300 comprises the router 122. The individual units and modules are interconnected via the internal data network 129. The external data network 127 connects the message-distributing module 301 to a controller 123 to field devices 125.

Moreover, in the example shown, the external data infrastructure 300 comprises a further message-distributing module 302 and a further control instance 304 including a further analysis module 306, a further development module 308, and a further execution module 310. Furthermore, the external data infrastructure 300 comprises a further router 124. The modules and entities are also interconnected via a further internal data network 130. Via a further external data network 128, the further message-distributing module 302 is connected to a further controller 131 having further field devices 133.

The internal data network 129 and the further internal data network 130 may be embodied separately from each other in such a way that data communication between the control instance 303 and the further control instance 304 is prevented. Alternatively, the internal data network 129 and the further internal data network 130 may be interconnected in such a way that data communication between the control instance 303 and the further control instance 304 is enabled.

In the example shown in FIG. 6, the controller 123 with the field devices 125 and the further controller 131 with the further field devices 133 are not components of a coherent automation system 100. Instead, FIG. 6 shows the case in which the controller 123 with the field devices 125 is a component of the automation system 100, while the further controller 131 with the further field devices 133 is a component of a further automation system 400. The automation system 100 and the further automation system 400 may be completely separate independent automation systems. For example, the automation system 100 and the further automation system 400 may be associated with different operators and have no relation to each other. Alternatively, the automation system 100 and the further automation system 400 may be assigned to a shared operator but e.g. be operated independently of each other at different locations.

In the example shown in FIG. 6, the external data infrastructure 300 is formed as an external cloud server that may be used by various users to organize or control automation processes of their automation systems 100 and/or further automation systems 400.

In the example shown in FIG. 6, the external data infrastructure 300 further comprises an input module 311. The input module 311 is connected to the control instance 303 via an external data connection 135 and to the further control instance 304 via another external data connection 136. The input module 311 allows a user to dial into the external data infrastructure 300 and provides the user with access to the control instance 303 or to the further control instance 304.

For example, if the user dials into the control instance 303 via the input module 311, the input module 311 is able to make appropriate prompts to the analysis module 305, the development module 307, or the execution module 309. Through this, the user may e.g. individually vary and control the analysis process of the analysis module 305. Furthermore, the user may use the development module 307, e.g. if this is embodied as a programming environment, to create a control program or further software modules in a corresponding programming process. Moreover, the user may gain insight into the control of the automation process or the controller 123 via a corresponding prompt to the execution module 309 by providing the user with corresponding process data or analyzed process data. Furthermore, the user may actively influence the control of the automation process via corresponding prompts to the execution module 309 and influence the automation process, e.g. by starting or stopping corresponding control programs.

The same applies to the further control instance 304, via which a user is allowed to access the control of the automation process of the further automation system 400 via the input module 311.

In the example shown in FIG. 6, the automation system 100 and the further automation system 400 are separate automation systems. This means that two different and separate access instances must be created for an access to the control instance 303 and for an access to the further control instance 304. This is shown via the external data connection 135 and the further external data connection 136. In the example shown in FIG. 6, the input module 311 comprises a first access instance 312 which is connected to the control instance 303 via the external data connection 135, and a second access instance 313 which is connected to the further control instance 304 via the further external data connection 136. Both access instances are explicitly separated from each other, so that it is ensured that via the first access instance 312 exclusively access to the control instance 303 and thus to the automation system 100 is enabled, while via the second access instance 313 exclusively access to the further control instance 304 and thus to the further automation system 400 is enabled.

In the example shown in FIG. 6, the input module 311 is embodied as a web site of the external data infrastructure 300. In the present example, the access instances may be interpreted as a user account that may be set up on the website and the input module 311, respectively.

In this context, the external data connection 135 and the further external data connection 136 may be an Internet connection that guarantees private and secured access to the user accounts and the corresponding control instances and automation systems, respectively, via appropriate encryption.

The external data network 127 and the further external data network 128 may also be an Internet connection, and data communication between the message-distributing modules and the controllers may be performed on the basis of an MQTT protocol. The internal data network 129, on the other hand, may be a data bus system, and data communication between the modules and units of the external data infrastructure 300 may be performed on the basis of an appropriate bus-based communication protocol.

As an alternative to the example shown in FIG. 6, the external data infrastructure 300 may include a plurality of control instances 303 including the modules shown, each associated with a plurality of independent automation systems 100, 400.

Figure 7:
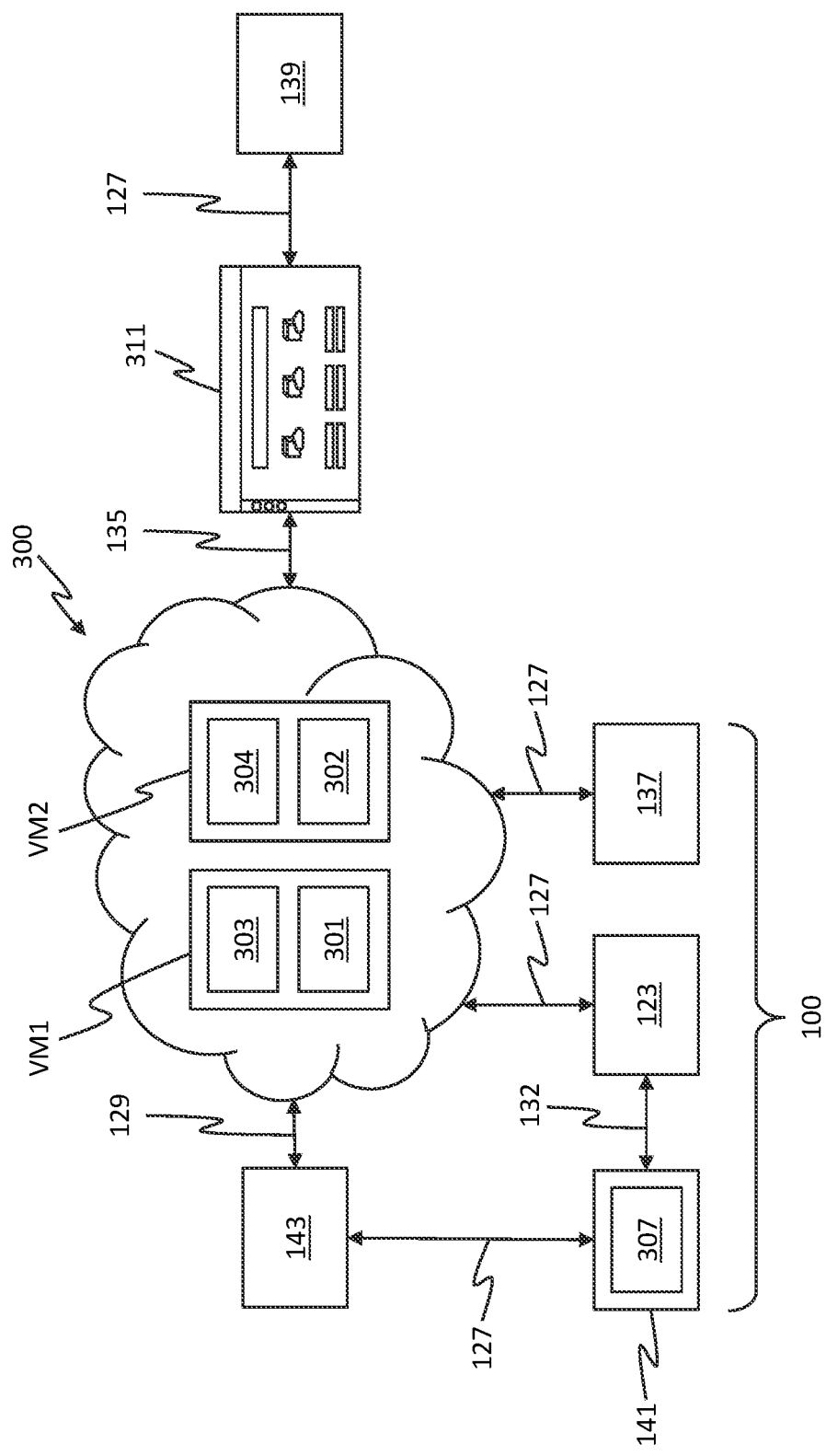
FIG. 7 a schematic depiction of a data infrastructure according to a further example.

FIG. 7 shows a schematic diagram of a data infrastructure 300 according to a further example.

In the example shown in FIG. 7, the external data infrastructure 300 is again a cloud server. The external data infrastructure 300 comprises a control instance 303 and a message-distributing module 301. According to FIG. 6, the control instance 303 comprises the analysis module 305, the development module 307 and the execution module 309. In FIG. 7, the control instance 303 and the message-distributing module 301 are installed in a first virtual machine VM1. In addition, the external data infrastructure 300 includes a second virtual machine VM2 in which the further message-distributing module 302 and the further control instance 304 are installed.

The external data infrastructure 300 is connected to the controller 123 via the external data network 127. The controller 123 comprises field devices 125 which are shown in FIGS. 1 and 6. The external data infrastructure 300 is further connected to a bus coupler 137 of the automation system 100 via the external data network 127.

Via an internal data link 132, the controller 123 is further connected to a further data processing unit 141 on which a development module 307 is installed. The further data processing unit 141 may be a data processing unit of a control level of the automation system 100.

The external data infrastructure 300 further comprises an input module 311 connected to the external data infrastructure 300 via the external data connection 135.

The input module 311 is further connected to a data processing unit 139 via the external data network 127.

In the example shown in FIG. 7, the input module 311 is embodied as a website of the external data infrastructure 300. In the present example, the data processing unit 139 is a mobile device. In the present example, the external data network 127 is an Internet connection.

A user may thus establish a connection to the input module 311 configured as a website using the data processing unit 139 or the mobile device and an existing Internet connection in the form of the external data network 127. For example, the Transmission Control Protocol TCP may be applied to establish the Internet connection. On the website of the input module 311, the user may create an access instance in the form of a user account and thus establish access to the external data infrastructure 300. The connection via the access instance of the input module 311 to the external data infrastructure 300 may be established via the external data connection 135. The external data connection 135 may also be implemented via an Internet connection. In particular, the external data connection 135 may be implemented via the Remote Desktop Protocol RDP. Via the access instance of the input module 311 and the external data connection 135, the user may thus establish access to the first virtual machine VM1 and/or the second virtual machine VM2 and the modules installed thereon. Via corresponding prompts entered by the users on their mobile device, the user may thus operate the corresponding modules of the control instance 303 and/or further control instance 304.

For example, the users may access the development module 307 of the control instance 303 of the first virtual machine VM1 via their mobile device and the accessed website of the input module 311 and perform programming of a control program or another software module within the development module 307.

In the example shown in FIG. 7, a development module 30 is installed in the further data processing unit 141 in addition to the development module 3077 of the control instance 303 of the first virtual machine VM1. This enables the user to download a development project, which the user has started via the user's mobile device and the accessed website of the input module 311 in the development module 307 of the control instance 303 of the first virtual machine VM1 for creating a control program or a further software module, to the further data processing unit 141 via the external data network 127 through which the further data processing unit 141 is connected to the external data infrastructure 300, and to further process the development project in the development module 307 of the further data processing unit 141.

The user may thus process a development project via the website of the input module 311 in the first virtual machine VM1 or also a further data processing unit 141, in particular a further data processing unit 141 of the automation system 100. The further data processing unit 141 may e.g. be a computer of a control level or control level of the automation system 100.

The external data infrastructure 300 further comprises a source controller 143, via which changes to the processed development projects may be logged. After completion, the user may upload the completed development project or the programmed control program or software module to the external data infrastructure 300 and execute it through the first virtual machine VM1 or execute it in the further data processing unit 141 or forward it to the controller 123 via the internal data connection 132 and execute the control program or software module in the controller 123.

The controller 123 and the bus coupler 137 are connected to the external data infrastructure 300 via the external data network 127 and are capable of performing data communication according to the method 200. The data communication may be carried out on the basis of the transmission control protocol TCP. In the example shown in FIG. 7, in addition to data communication between the external data infrastructure 300 and the controller 123, as already documented in the description of the preceding FIGS. 1 to 6, data communication is enabled between the external data infrastructure 300 and a bus coupler 137 of the automation system 100. Such a bus coupler 137 may be interpreted in the present context as a communication subscriber 121 of a corresponding communication network 119. The method 200 may be performed in an analogous manner between a controller 123 and a bus coupler 137 as a communication subscriber 121 of a communication network 119.

A data transmission between the source controller 143 and a virtual machine of the external data infrastructure 300 may be performed via the software modules Put/Commit. A data transmission between the source controller 143 and the further data processing unit 141 may be performed via the software module GIT.

As an alternative to the example shown in FIG. 7, in which the control instance 303 is installed in the first virtual machine VM1 and the further control instance 304 is installed in the second virtual machine VM2, identical control instances may be installed on a plurality of virtual machines. Alternatively, individual modules of the control instances may be installed on different virtual machines. Each of the virtual machines disposed on the external data infrastructure 300 may function as a stand-alone controller 123 of an automation system 100 and may have all the functions of a controller 123.

Figure 8:
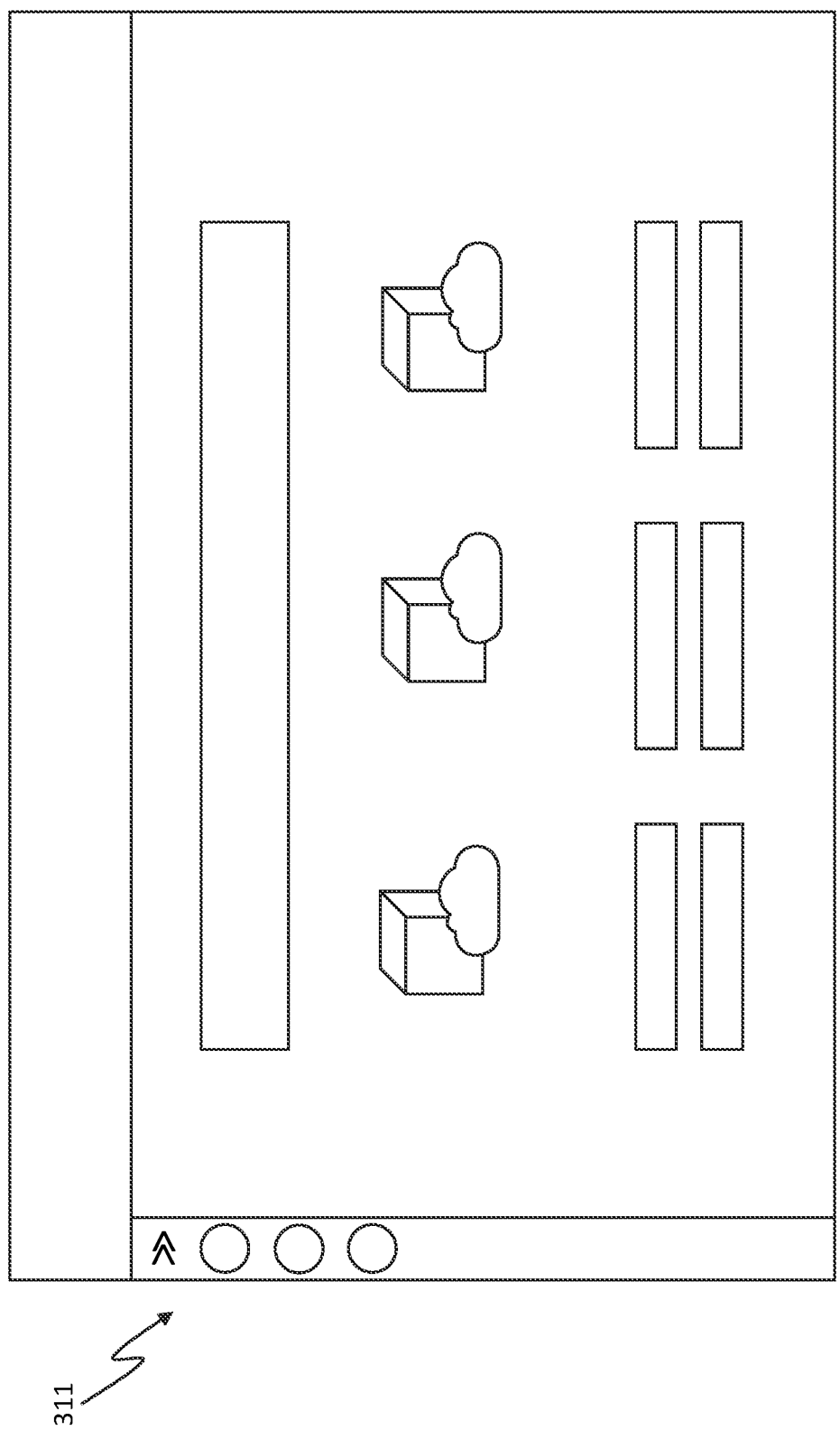
FIG. 8 a schematic depiction of an input module according to an example.

FIG. 8 shows a schematic diagram of an input module 311 according to an example.

In FIG. 8, the input module 311 is embodied as a website of the external data infrastructure 300. After a user creates an access instance, the user may access various virtual machines installed on the external data infrastructure 300. In the example illustrated in FIG. 8, the user may access a first virtual machine VM1, a second virtual machine VM2, and a third virtual machine VM3. As mentioned with reference to FIG. 7, the individual virtual machines may have various modules for controlling an automation system 100. By making appropriate prompts to the respective modules of the virtual machines, the user may affect various portions of a control of an automation system 100, as set forth above. As also set forth above, the user may do this from any computer or mobile device provided with Internet access. The user is thus able to dial into the external data infrastructure 300, which is in the form of a cloud server, from any location via the input module 311, which is in the form of a website, and thus observe the control process of the automation system 100 or various automation systems or actively intervene in the control of the automation system 100 or a plurality of automation systems by making corresponding prompts to the respective modules of a control instance 303.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of Reference Numerals: 100-231

100 Automation system
101 First controller
103 Second controller
105 First field device
106 First bus system
107 Second field device
109 First communication network
111 First communication subscriber
112 Second bus system
113 Third controller
114 Third field device
115 Second communication network
117 Second communication partner
118 Third bus system
119 Communication network
121 Communication subscribers
122 Router
123 Controller
124 Further router TABLE 1-continued List of Reference Numerals: 100-231

125 Field device
127 External data network
128 Further external data network
129 Internal data network
130 Further internal data network
131 Further controller
132 Internal data connection
133 Further field device
135 External data connection
136 Further external data connection
137 Bus coupler
139 Data processing unit
141 Further data processing unit
143 Source controller
200 Method for operating an automation system
201 First identifying step
203 First sending step
205 Second identifying step
207 Forwarding step
209 Receiving step
211 Recording step
213 Transmitting step
215 Analyzing step
217 Second sending step
219 Influencing step
221 Generating step
223 Third sending step
225 First executing step
227 Second executing step
229 Fourth sending step
231 Controlling step

TABLE 2

List of Reference Numerals: 300-400, VNM1-VNM3

300 Data infrastructure
301 Message-distributing module
302 Further message-distributing module
303 Control instance
304 Further control instance
305 Analysis module
306 Further analysis module
307 Development module
308 Another development module
309 Execution module
310 Further execution module
311 Input module
312 First access instance
313 Second access instance
400 Further automation system
VM1 First virtual machine
VM2 Second virtual machine
VM3 Third virtual machine

The invention claimed is:

1. A method for operating an automation system comprising:
a first controller and at least a second controller configured for executing at least an automation process and for controlling a plurality of field devices, and
an external data infrastructure comprising a message-distributing module configured for switching data communication between communication subscribers of a communication network, the method comprising the following steps:
using the message-distributing module in a first identifying step, defining a first communication network, detecting the controllers of the automation system, assigning the first controller and the second controller to the first communication network and identifying the first controller and the second controller as first communication subscribers of the first communication network,
using the first controller in a first sending step, sending out a first network message within a framework of a data communication between the communication subscribers of the first communication network controller to the message-distributing module of the external data infrastructure,
using the message-distributing module in a second identifying step, identifying the second controller as one of the communication subscribers of the first communication network that is addressed by the first controller,
using the message-distributing module in a forwarding step, forwarding the first network message sent out by the first controller to the second controller, and
using the second controller in a receiving step, receiving the forwarded first network message.

2. The method according to claim 1, further comprising:
in a recording step, recording input process data representing a state of the automation process executed by the automation system in the field devices,
in a transmitting step, transmitting the input process data as process data from the field devices to the first controller within a framework of an exchange of process data, and
using the first controller in the first sending step, sending out the process data in the first network message within the framework of the data communication within the first communication network.

3. The method according to claim 2, wherein the external data infrastructure further comprises a control instance having an analysis module configured to analyze process data of the field devices according to predetermined analysis provisions, comprising:
using the analysis module in an analyzing step, analyzing the process data of the first network message received via the message-distributing module,
using the message-distributing module in a second sending step, sending out the analyzed process data in a second network message to the first controller and/or the second controller within the framework of the data communication within the first communication network, and
in an influencing step, influencing the automation process via the first controller and/or the second controller on the basis of the analyzed process data of the second network message.

4. The method according to claim 1, wherein the external data infrastructure further comprises a control instance having a development module for creating a control program executable by the first controller and/or the second controller for controlling the field devices, comprising:
using the development module in a generating step, generating a control program,
using the message-distributing module in a third sending step, sending out the generated control program in a third network message to the first controller and/or the second controller within the framework of the data communication within the first communication network and
in a first executing step, executing the generated control program and influencing the automation process via the first controller and/or via the second controller on the basis of the generated control program.

5. The method according to claim 1, wherein the external data infrastructure further comprises a control instance having an execution module for executing a control program for controlling the field devices of the automation system, comprising:
using the execution module in a second executing step, executing a control program and generating output process data, the output process data comprising control instructions to the field devices for controlling the field devices on the basis of the control program,
using the message-distributing module in a fourth sending step, sending out the generated output process data in a fourth network message to the first controller and/or to the second controller within the framework of the data communication within the first communication network, and
in a controlling step, influencing the automation process on the basis of the generated output process data of the generated control program via the first controller and/or via the second controller.

6. The method according to claim 1, wherein the automation system comprises at least a third controller comprising:
in a third identifying step, defining a second communication network and identifying the third controller and the first controller and/or the second controller as communication subscribers of the second communication network via the message-distributing module,
wherein a data communication takes place exclusively between the communication subscribers of the first communication network or between the communication subscribers of the second communication network.

7. The method according to claim 1, wherein data communication between the communication subscribers of the communication network is organized on the basis of a publisher/subscriber architecture, and
wherein network messages of the communication subscribers are identified with a topic via which an information content of the network messages is readable, and wherein network messages of various topics are subscribed to by different controllers identified as the communication subscribers.

8. The method according to claim 7, wherein the message-distributing module is configured as a message broker, and wherein the message-distributing module is configured to define communication networks on the basis of the various topics and to combine the network messages subscribed to by the respective controllers identified as the communication subscribers in the respective communication networks.

9. A data infrastructure system for executing the method according to claim 1, wherein the data infrastructure system is configurable as an external component of the automation system and connectable to internal components of the automation system, and comprises:
the message-distributing module for switching data communication between the communication subscribers of the communication network of the automation system, the message-distributing module being configured to define at least the communication network, to determine internal components of the automation system, to assign the internal components of the automation system to the communication network and to identify the internal components of the automation system as the communication subscribers of the communication network, the method further comprising:
receiving network messages transmitted from the communication subscribers within the framework of the data communication between the communication subscribers within the communication network, identifying addressed communication subscribers of the communication network, and forwarding the received network messages to the addressed communication subscribers.

10. The data infrastructure system according to claim 9, wherein the message-distributing module is configured to define a plurality of communication networks from a plurality of the internal components of the automation system and to identify the corresponding internal components as communication subscribers of one or more of the plurality of communication networks, and wherein data communication is enabled exclusively among said communication subscribers of a same communication network.

11. The data infrastructure system of claim 9, further comprising:

a control instance with an analysis module, wherein the analysis module is configured to analyze process data of the internal components of the automation system sent via at least a first network message, and wherein the message-distributing module is configured to send out the analyzed process data in at least a second network message to the communication subscribers of the communication network.

12. The data infrastructure system of claim 11, wherein the control instance further comprises a development module, wherein the development module is configured to generate a control program for controlling the automation process, and wherein the message-distributing module is configured to transmit the generated control program in a third network message to the communication subscribers of the communication network.

13. The data infrastructure system according to claim 11, wherein the control instance further comprises an execution module configured for executing a control program for controlling the automation process, wherein the execution module is configured to execute a control program and generate output process data, wherein the output process data comprise control instructions to the internal components of the automation system for controlling the automation process on the basis of the control program, and wherein the message-distributing module is configured to transmit the generated output process data in a fourth network message to the communication subscribers of the communication network.

14. The data infrastructure system according to claim 11, further comprising an input module for inputting prompts to the control instance, wherein the input module is connectable to the control instance and adapted for a user:

to view an analysis process of the analysis module and/or influence an analysis process of the analysis module using a corresponding prompt, to generate the control program via a corresponding prompt to the development module, and to influence the control of the automation process and/or view process data of the automation process.

15. The data infrastructure system according to claim 9, wherein the data infrastructure system is configured as a cloud server, wherein the input module is configured as a website for a user to dial into the data infrastructure system, and wherein the input module is configured to be accessed on a computer unit, in particular a personal computer or a mobile device.

* * * * *